(12) United States Patent
Kang et al.

(10) Patent No.: US 12,454,937 B2
(45) Date of Patent: Oct. 28, 2025

(54) HYDROPOWER EQUIPMENT WITH GRADED UTILIZATION OF KINETIC ENERGY OF FLOWING WATER

(71) Applicant: JIANGSU UNIVERSITY, Jiangsu (CN)

(72) Inventors: Can Kang, Jiangsu (CN); Xiaoyu Jia, Jiangsu (CN); Jin Yin, Jiangsu (CN); Yongchao Zhang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 0 days.

(21) Appl. No.: 18/693,161

(22) PCT Filed: Jul. 12, 2023

(86) PCT No.: PCT/CN2023/106920
§ 371 (c)(1),
(2) Date: Mar. 19, 2024

(87) PCT Pub. No.: WO2025/010645
PCT Pub. Date: Jan. 16, 2025

(65) Prior Publication Data
US 2025/0243839 A1    Jul. 31, 2025

(30) Foreign Application Priority Data
Jul. 11, 2023 (CN) .......................... 202310844766.7

(51) Int. Cl.
*F03B 17/06* (2006.01)
(52) U.S. Cl.
CPC ................. *F03B 17/065* (2013.01)

(58) Field of Classification Search
CPC .................................................... F03B 17/065
See application file for complete search history.

(56) References Cited

U.S. PATENT DOCUMENTS 8,058,741 B1 *  11/2011  Echemendia ............. F03B 7/00
                                                           290/53

FOREIGN PATENT DOCUMENTS

| CN | 1795330 | 6/2006 |
| CN | 101718246 | 6/2010 |

(Continued)

OTHER PUBLICATIONS

"International Search Report (Form PCT/ISA/210) of PCT/CN2023/106920", mailed on Dec. 22, 2023, pp. 1-4.

(Continued)

*Primary Examiner* — Viet P Nguyen
(74) *Attorney, Agent, or Firm* — JCIPRNET

(57) ABSTRACT

The disclosure relates to a hydropower equipment with graded utilization of kinetic energy of flowing water, including three steps on the inclined surface of the triangular base from top to bottom, wherein support rods are provided on the vertical surface of each step, runner one, runner two and runner three arranged in sequence from high to low are respectively and rotatably supported on the corresponding support rods through the shaft, all the three shafts are horizontally arranged and connected to the corresponding shaft of the generator; horizontal flow channels are set inside the lower part of the triangular base for guiding water to flow toward downstream direction, and the outlets of the horizontal flow channels directly face runner three.

11 Claims, 2 Drawing Sheets

(56) References Cited

FOREIGN PATENT DOCUMENTS

| | | |
|---|---|---|
| CN | 201650567 | 11/2010 |
| CN | 102913367 | 2/2013 |
| CN | 207047804 | 2/2018 |
| CN | 207701272 | 8/2018 |
| CN | 207728477 | 8/2018 |
| CN | 108691722 | 10/2018 |
| CN | 110735753 | 1/2020 |
| CN | 112901402 | 6/2021 |
| JP | 2014118961 | 6/2014 |

OTHER PUBLICATIONS

"Written Opinion of the International Searching Authority (Form PCT/ISA/237) of PCT/CN2023/106920", mailed on Dec. 22, 2023, pp. 1-3.

* cited by examiner

HYDROPOWER EQUIPMENT WITH GRADED UTILIZATION OF KINETIC ENERGY OF FLOWING WATER

CROSS-REFERENCE TO RELATED APPLICATION

This application is a 371 of international application of PCT application serial no. PCT/CN2023/106920, filed on Jul. 12, 2023, which claims the priority benefit of China application no. 202310844766.7, filed on Jul. 11, 2023. The entirety of each of the above-mentioned patent applications is hereby incorporated by reference herein and made a part of this specification.

TECHNICAL FIELD

The present invention relates to an integrated device installed in ocean currents or rivers that utilizes the kinetic energy of water for generating power, in particular to a hydroelectric power equipment that uses a triangular base in combination with three drag-type runners. The invention belongs to the field of hydroelectric power generation technology.

RELATED ART

The utilization of the kinetic energy of water in ocean and rivers is an important branch of clean energy utilization. The runner is a pivotal component for converting the kinetic energy of water, and during its operation, the runner is generally submerged in water, and the water carrying the kinetic energy acts directly on the runner blades, generating a force that drives the rotation of the blades. Due to the rigid connection between the runner and the shaft, the shaft tends to rotate. Once the driving force on the runners and shaft overcomes the factors that prevent their rotation, such as the frictional torque, the runner and the shaft begin to rotate, and the runner will remain rotating due to continuous action of flowing water; furthermore, the shaft and the rotor of the generator are directly connected or indirectly connected through variable speed gears, the rotor of the generator serves as another resistance component that prevents the rotation of the runner and the shaft, and when the force generated by flowing water is sufficient to propel the runner, the shaft and the rotor of the generator to rotate and enable them to attain a certain speed, the electromagnetic induction is generated between the rotor and the stator of the generator, leading to the generation of current.

Runners are generally classified into two types: lift-type and drag-type runners, and the lift-type runner produces the lift force to drive the rotation of the blades, which is ascribed to the profile of the blade section; the drag-type runner generates a force that drives the rotation of the blades through the pressure difference between the working surface and the back surface of the blades. The energy density of flowing water is high, and under the conditions of the same water flow velocity and the same area of action, the drag-type runner outputs a torque greater than that of the lift-type runner. From the perspective of practical operation, there are three influential factors that need to be paid attention to for the hydrokinetic power generation device: the first is cost, such as the cost of raw material, processing and manufacturing, installation and maintenance; the second is the impact of the operation of the power generation device on the environment, such as whether it will induce noise hazardous to aquatic organisms, whether it will cause a scouring effect on the riverbed or seabed, and whether it will affect the ships passing by, etc; the third is the ability of the power generation device to withstand unexpected situations, such as whether it will be washed away by instantaneously accelerated flowing water, whether the blades will break off, whether the blades will be corroded, etc.

The hydrokinetic power generation device is generally submerged in flowing water, and for the hydropower generation device equipped with the horizontal-axis runner, the axis of rotation is consistent with the direction of the incoming flow, and when the runner rotates, it forms a disc-shaped working surface facing the incoming flow, and the force exerted by the flowing water on this surface produces a tilting moment on the whole power generation device. For a hydrokinetic power generation device equipped with a vertical-axis runner, the runner is oriented in vertical direction and perpendicular with the direction of the incoming water. When the runner operates, it forms a working surface with a height equivalent to the height of the runner and a width equivalent to the runner diameter. The incoming water also generates a tilting moment on the whole power generation device. Meanwhile, the bottom of the blades of the vertical-axis runner is generally close to the seabed or riverbed, and the rotation of the runner can easily cause scouring of the downstream seabed or riverbed, and even generate plumes, damaging underwater environment. Among the vertical-axis runners, the lift-type runners have a high rotational speed and cause more severe scouring of the downstream seabed or riverbed. For small-sized runners, a multi-runner arrangement has been adopted, which consists of multiple horizontal or vertical-axis runners to form a group of runners, although such a configuration increases the capacity of the power generated, it cannot avoid the impact of the tilting moment on the operating stability of the power generation device, as well as the scouring of the downstream seabed or riverbed incurred by the rotation of the runners.

In summary, the sizes of the hydropower generation devices that have been put into operation are various, and the scenario of application involves ocean, rivers, etc, and both lift-type and drag-type runners have been applied, and both horizontal and vertical-axis runners are in service, however, two prominent issues have not been addressed yet, ad the first one is the structural stability of the hydrokinetic power generation device under the action of flowing water; the second one is the scouring of the downstream seabed or riverbed caused by the rotation of the runner.

SUMMARY OF INVENTION

The purpose of the present invention is to overcome the shortcomings of existing technology and provide a hydropower equipment with graded utilization of kinetic energy of flowing water, aiming to improve the structural stability of the device, alleviate or avoid the scouring effect of the rotation of the runner on downstream seabed or riverbed.

The object of the present invention is achieved through the following technical solutions:

A hydropower equipment with graded utilization of kinetic energy of flowing water, characterized in that: it contains a triangular base and three runners, and the inclined surface of the triangular base is a segmented smooth surface, with three steps from top to bottom on the inclined surface, and each step has support struts on the vertical surface, and runner one, runner two and runner three arranged in order from high to low are rotatably supported on corresponding support struts through the shaft, and the three shafts are all horizontally arranged and connected to the corresponding generator shafts, respectively; horizontal flow channels are set inside the lower part of the triangular base for guiding water to flow toward downstream direction, and the outlets of the horizontal flow channels directly face the curved segments of the blades of runner three.

Furthermore, for the above-mentioned a hydropower equipment with graded utilization of kinetic energy of flowing water, runner one, runner two and runner three all include a hub and four blades, and the four blades are evenly distributed in circumferential direction; alternatively, adjacent blades are separated circumferentially by an angle of 90°; the thickness of each blade gradually decreases from the hub to the blade tip, and each blade is composed of a straight and a curved segment, and the flowing water impacts the concave surface of the curved segment of the blade, driving the blade to rotate from the concave surface to its convex surface, then the runner rotates and the blade alternates to vertical position, and flowing water continues to impact the concave surface of the blade, and the runner remains rotating.

Furthermore, for the above-mentioned a hydropower equipment with graded utilization of kinetic energy of flowing water, characterized in that: a single blade of each runner attains vertical position, i.e., the blade tip pointing upwards and the height of the blade is higher than that of the vertical surface of the step on which it is mounted, so that the flowing water from above can impact the protruding part of the blade.

Furthermore, for the above-mentioned a hydropower equipment with graded utilization of kinetic energy of flowing water, characterized in that runners two and one have the same dimensions, and the diameter of runner three is 1.5 times the diameters of runners two and one.

Furthermore, for the above-mentioned a hydropower equipment with graded utilization of kinetic energy of flowing water, characterized in that when a single blade of runner one is oriented in vertical position, the length of its protruding part relative to the adjacent step equals the radius of its arc segment.

Furthermore, for the above-mentioned a hydropower equipment with graded utilization of kinetic energy of flowing water, characterized in that when a single blade of runner two is oriented in vertical position, the length of its protruding part relative to the adjacent step equals the radius of its arc segment.

Furthermore, for the above-mentioned a hydropower equipment with graded utilization of kinetic energy of flowing water, characterized in that when a single blade of runner three is oriented in vertical position, the length of its protruding part relative to the adjacent step is the radius of its arc segment.

Furthermore, for the above-mentioned a hydropower equipment with graded utilization of kinetic energy of flowing water, characterized in that: runner one, runner two and runner three are all connected with the shaft through keys, and the shafts are coaxially connected to the shafts of corresponding generators.

Furthermore, for the above-mentioned a hydropower equipment with graded utilization of kinetic energy of flowing water, characterized in that: the cross section of the triangular base has an approximate shape of a right-angled triangle, and one right-angled edge of the triangular base is horizontally placed and contacts the seabed or riverbed, and the other right-angled edge is vertically placed.

Furthermore, for the above-mentioned a hydropower equipment with graded utilization of kinetic energy of flowing water, characterized in that: there are two horizontal flow channels with rectangular cross sections in the lower part of the triangular base, and the height of the outlets of the two flow channels correspond to ¾ the diameter of the runner, the axial positions of the two outlets correspond to ¼ and ¾ the shaft of the runner, respectively; runner three is impacted simultaneously by one stream of water from the inclined plane and two streams of water discharged from the horizontal flow channels.

Furthermore, for the above-mentioned a hydropower equipment with graded utilization of kinetic energy of flowing water, characterized in that the triangular base is fabricated through cement pouring, and the vertical surface of the steps is pre-embedded with support struts.

The present invention has significant advantages and beneficial effects over current technology, as embodied in the following aspects:

① The present invention adopts a combination of a base with an approximate cross sectional profile of a right angled triangle and three runners, utilizing the kinetic energy of water stepwise, and when water flows through the device, a stream of water flows around the device and passes sequentially through the three drag-type runners in inclined direction, generating a torque that causes the drag-type runners to rotate, and the rotation of the runner shaft leads to the rotation of the rotor of the generator, generating current through electromagnetic induction; the other two streams of water flow toward downstream direction through the two horizontally oriented rectangular flow channels inside the device, and the two streams of water, together with the downward flowing water from the inclined plane, push runner three to rotate, and the torque propelling runner three to rotate is increased considerably; the energy utilization ratio is relatively high;

② Based on the principles of fluid dynamics, through utilizing the fluid dynamics characteristics of water flow passing through a triangular base and the combination of three runners, the kinetic energy of water flow passing through the device is utilized stepwise, while alleviating or avoiding the scouring effect caused by the rotation of the runners on downstream seabed or riverbed, and improving the structural stability of the hydrokinetic energy power generation device;

③ Adopting a prefabricated integrated structure, all the three runner shafts are mounted in horizontal direction, and the runner and the generator are horizontally supported on support struts, which are embedded in the vertical surface of the step of the triangular base; in order to harness more kinetic energy from incoming water, the outer diameter of runner three is greater than that of runner one and runner two, and the flow velocity near runner three is relatively low, and the flow direction is nearly horizontal, so the flow will not scour the downstream bed;

④ An appropriate number of runners are deployed properly along the inclined plane of the triangular base, and on the one hand, the energy of flowing water will be sufficiently utilized; on the other hand, overall height of the device is also reasonable, and the device will not obstruct the incoming water;

⑤ The equipment is easy to install and can sufficiently utilize the kinetic energy of water, and it can be used alone or in clusters, avoiding the scouring of downstream seabed or riverbed and the tilting moment generated due to the impact of flowing water on the runner installed independently.

Other features and advantages of the present invention will be set forth in the ensuing specification and, in part, will become apparent from the specification or will be understood by carrying out specific embodiments of the invention. The objects and other advantages of the present invention may be achieved and obtained by means of the structure particularly indicated in the specification as written and in the accompanying drawings.

BRIEF DESCRIPTION OF THE DRAWINGS

In order to provide a clearer explanation of the technical solution of the embodiments of the present invention, a brief introduction will be made to the accompanying drawings required in the embodiments. It should be understood that the following drawings only illustrate certain embodiments of the present invention, and therefore should not be regarded as limiting the scope. For ordinary technical personnel in the art, other relevant drawings can be obtained based on these drawings without creative labor.

DESCRIPTION OF THE EMBODIMENTS

Figure 1:
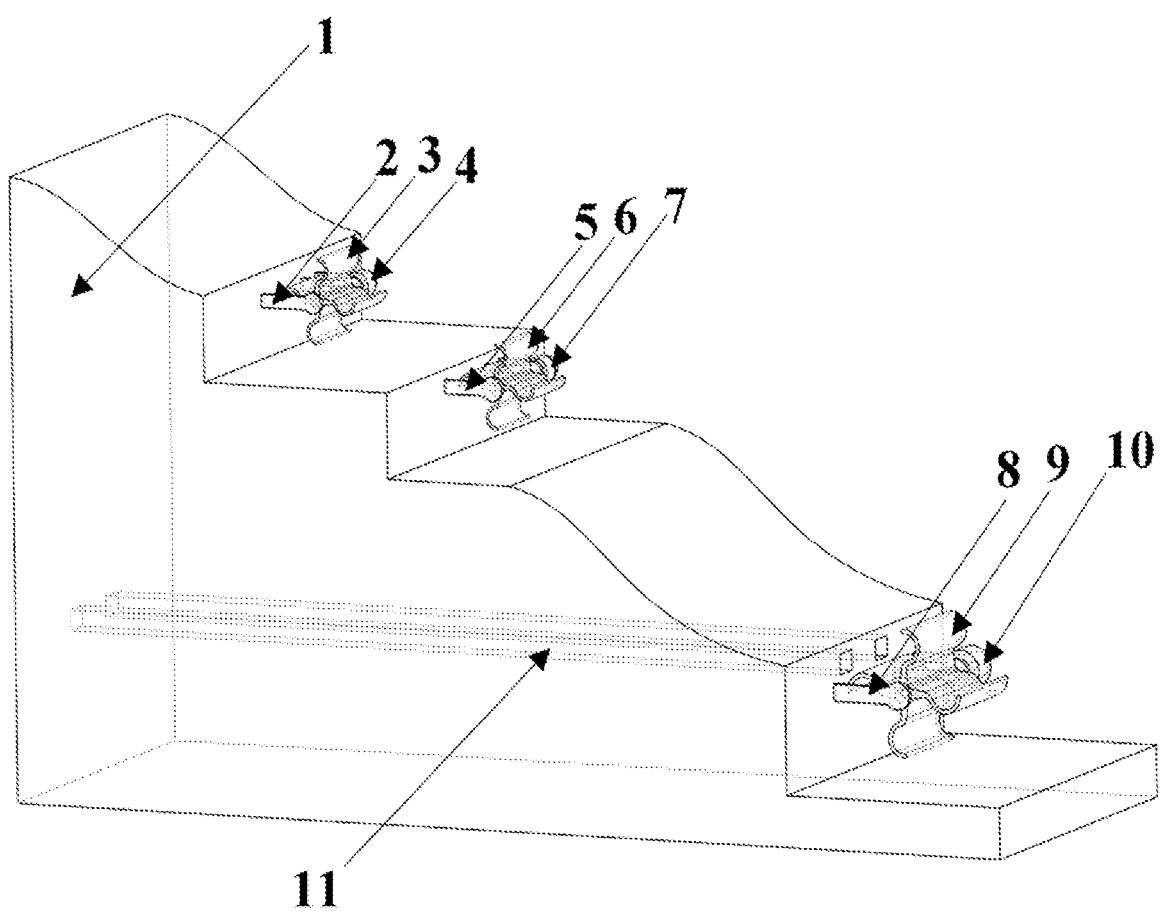
FIG. 1: a schematic diagram of the structure of the equipment of the present invention.

The following will provide a clear and complete description of the technical solution in the embodiments of the present invention, in conjunction with the accompanying drawings. Obviously, the described embodiments are only a part of the embodiments of the present invention, not all of them. The components of the embodiments of the present invention described and shown in the accompanying drawings can be arranged and designed in various different configurations. Therefore, the following detailed description of the embodiments of the present invention provided in the drawings is not intended to limit the scope of the claimed invention, but only to represent selected embodiments of the present invention. Based on the embodiments of the present invention, all other embodiments obtained by those skilled in the art without creative labor fall within the scope of protection of the present invention.

It should be noted that similar labels and letters represent similar terms in the following figures. Therefore, once a term is defined in one figure, it does not need to be further defined or explained in subsequent figures. Meanwhile, in the description of the present invention, terms such as orientation and order are only used to distinguish descriptions and cannot be understood as indicating or implying relative importance.

Figure 2:
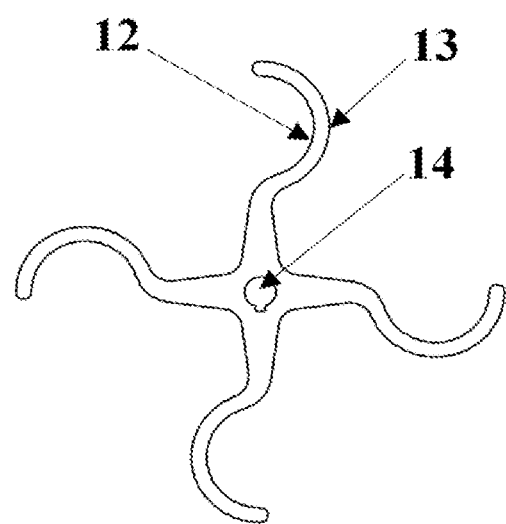
FIG. 2: a schematic diagram of the structure of the runner.

As shown in FIGS. 1 and 2, a hydropower equipment with graded utilization of kinetic energy of flowing water includes triangular base 1, runner one 3, runner two 6, and runner three 9. The inclined surface of triangular base 1 is a segmented smooth surface, with three steps from top to bottom on the inclined surface. Support struts are installed on vertical surface of each step, and runner one 3, runner two 6, and runner three 9 are arranged in sequence from high to low. Runner one is rotatably supported on support strut one 2 through runner shaft one. Generator one 4 is installed on support strut one 2, and runner shaft one is coaxially connected to the shaft of generator one 4. Runner two 6 is rotatably supported on support strut two 5 through runner shaft two, and generator two 7 is installed on support strut two 5. Runner shaft two is coaxially connected to the shaft of generator two 7. Runner three 9 is supported on support strut three 8 through runner shaft three, and generator three 10 is installed on support strut three 8. Runner shaft three is coaxially connected to the shaft of generator three 10. Runner shaft one 3, runner shaft two 6 and runner shaft three 9 are all oriented horizontally.

The structures of runner one 3, runner two 6 and runner three 9 are identical, as shown in FIG. 2. They all contain a hub and four blades, all of which are evenly distributed in circumferential direction, and with an angle of 90° between adjacent blades. The thickness of each blade gradually decreases from the hub to the blade tip, and the blade is composed of a straight and a curved segment. The flowing water impacts the concave surface (working surface) 12 of the curved segment of the blade, driving the blade to rotate from the concave surface to its convex surface (back surface) 13, causing the runner to rotate. When the blade alternates to vertical position, the flowing water continues to impact the concave surface of the blade, causing the runner to rotate continuously. When each individual blade of the runner attains vertical position, with the blade tip pointing upwards, the height of the blade is higher than that of the adjacent surface of the step on which the runner is mounted, allowing the water flowing from above to impact the protruding part of the blade. The shaft hole 14 of the runner is connected to its shaft through a key, and the shaft is concentric with the shaft of the corresponding generator.

Three runners are arranged from high to low along the inclined plane of the triangular base. If only two runners are deployed, the utilization of the kinetic energy of water will be insufficient. If four or more are arranged, the overall height of the device will be relatively high, posing an apparent obstruction to incoming water.

The dimensions of runner two 6 and runner one 3 are the same, while the diameter of runner three 9 is 1.5 times that of runner two 6 and runner one 3. When a single blade of runner one 3 is oriented in vertical position, the length of the protruding part relative to the adjacent step equals the radius of its arc segment. When a single blade of runner two 6 is oriented in vertical position, the length of its protruding part relative to the adjacent step equals the radius of its arc segment. When a single blade of runner three 9 is in vertical position, the length of its protruding part relative to the adjacent step equals the radius of its arc segment.

The cross section of triangle base 1 has an approximate shape of a right-angled triangle, with one right-angled edge of the triangle base placed horizontally to contact the seabed or riverbed, and the other right-angled side placed vertically. The base is installed on the seabed or riverbed, and whether additional fixing device is needed depends on practical condition of installation.

Two horizontal flow channels 11 with rectangular cross sections are set inside the lower part of triangular base 1. The outlets of horizontal flow channels 11 directly face the curved segment of the blades of runner three 9. Water is guided by the horizontal flow channels 11 to flow toward downstream direction. The outlets of the two horizontal flow channels correspond to the height of ¾ the diameter of runner three 9, and in axial direction, the two outlets correspond to the axial positions of ¼ and ¾ of runner three, respectively. Runner three 9 is simultaneously impacted by the stream of water coming from the inclined plane and two streams of water discharged from the two horizontal channels.

For fabrication and assembly, the method of prefabrication in an onshore workshop is adopted, and the triangular base is made into a predetermined shape, with the horizontal channels opened. The vertical surface of the three steps is pre-embedded with struts for supporting the runner and the generator. Then, the runners and generators are installed on corresponding support struts through bearings and connectors, and then they are installed on the triangular base. After assembly, the device is submerged in water, and the operation and sealing are checked. During on-site installation, additional fixing devices can be used to fix the device on the bed according to practical operating environment of ocean and river.

The base with an approximate right-angled triangle geometry is constructed through pouring cement and adding reinforcing agents to enhance its strength. The support struts are connected to the base through pre-embedding, and the runner shaft is concentric with the generator shaft. At the inlets of the two horizontal flow channels inside the lower part of the triangular base, filtering devices can be deployed according to the water quality to prevent large-sized objects from entering and clogging the horizontal flow channels. The surface roughness of the entire base should meet general cement pouring requirements.

When applied, the above-mentioned a hydropower equipment with graded utilization of kinetic energy of flowing water is suitable for oceans and rivers where flow directions maintain roughly certain. When water flows around the hydropower equipment, a portion of water flows downward along the inclined edge under the guidance of the vertical surface of the base and gravity, and the other portion of water flows into two horizontal channels 11 inside the base under the pressure difference between upstream and downstream. For the former portion of the flowing water, when it passes through runner one 3, it impacts the protruding blade part of runner one 3 relative to the step. Even if no blade of runner one 3 is in vertical position at this moment, the flowing water can still impact the blades through obliquely downward motion, causing runner one 3 to rotate in clockwise direction, driving the rotor of generator one 4 to rotate, and outputting current through electromagnetic induction. Meanwhile, the impact force from flowing water hindering the clockwise rotation of the runner is counteracted due to the presence of steps. The flowing water, with its kinetic energy having been partially converted into mechanical energy, continues to flow downwards along the inclined edge, impacting the protruding part of the blade of runner two 6 relative to the step, causing runner two 6 to rotate, driving the rotor of generator two 7 to rotate, and outputting current through electromagnetic induction. The flowing water, with its kinetic energy having been partially converted into mechanical energy, continues to flow downwards along the inclined edge, impacting the protruding blade part of runner three 9 relative to the step, driving the rotor of generator three 10 to rotate, and outputting current through electromagnetic induction. Meanwhile, for the latter portion of the flowing water, i.e., the water flowing downstream through the horizontal flow channels 11, since the outlets of the horizontal flow channels face directly the curved part of the blade of runner three 9, it also generates a force to drive the clockwise rotation of runner three 9, thereby increasing the torque that propels runner three 9 to rotate. The two portions of flowing water, with most of their kinetic energy having been converted into mechanical energy, meet and mix at the lower right corner of the triangular base and then travel toward downstream direction. With low flow velocity and nearly horizontal flow direction, the flow downstream of the base will not scour the downstream bed.

The hydropower equipment can be prefabricated and assembled in an onshore workshop, transported as a whole to the installation site, and installed on site with auxiliary tools such as the deployment device on the ship deck and underwater positioning system. The hydrokinetic power generation device can be used alone or applied in clusters.

When the velocity of upstream water is relatively low, the water flowing around the base tends to move along the inclined surface of the base, and the concave surface of the runner blade undergoes the impact of flowing water, generating a torque that causes the runner to rotate clockwise. Due to the fact that the convex surface of the runner blades does not withstand the impact of incoming flow, the force that impedes the clockwise rotation of the runner is eliminated. When the velocity of incoming water is relatively high, the incoming water bypasses the base, leading to a secondary flow above the inclined surface of the base. The inclined surface effectively transforms the secondary flow into a unidirectional flow, achieving a pushing effect on clockwise rotation of the runner. For runner three, on the one hand, it suffers from the impact of water flowing from the upper left, and on the other hand, it bears the impact of water discharged from the horizontal channels inside the triangular base. Runner three has a relatively larger diameter and therefore can receive more kinetic energy from the flowing water. Consequently, more power can be generated by runner three.

In summary, the present invention adopts a combination of a base featured by a cross-sectional profile of an approximate right-angled triangle and three runners, utilizing the kinetic energy of water stepwise. When water flows through the device, a stream of water flows around the device, and this portion of water passes sequentially through three drag-type runners configured along the inclined surface of the base, generating a torque that drives the rotation of the drag-type runners. The runner shaft drives the rotation of the rotor of the generator, generating current through electromagnetic induction. The other two streams of water flow toward downstream direction through two horizontal channels with rectangular cross sections inside the device. These two streams of water, together with the downward flowing water from the inclined surface, push runner three to rotate, increasing significantly the torque on runner three. The ratio of energy utilization is relatively high.

Based on the principles of fluid dynamics, through utilizing the fluid dynamics characteristics of water flowing through a triangular base and the combination of three runners, the kinetic energy of water is utilized stepwise. Meanwhile, the scouring of the downstream seabed or riverbed by the rotation of the runners is alleviated or even avoided. The structural stability of the hydrokinetic energy power generation device is improved.

A prefabricated integrated structure is adopted, and all the three shafts are oriented in horizontal direction. The runners and generators are horizontally supported on supporting struts, which are pre-embedded into the vertical surface of the steps of the triangular base. The diameter of runner three is larger than that of runner one and runner two. Therefore, more kinetic energy from flowing water is received by runner three. Moreover, the flow velocity downstream runner three is relatively low, and the flow direction is nearly horizontal, so the scouring of the downstream bed is avoided.

On the inclined surface of the triangular base, runners with an appropriate number are installed. On the one hand, the energy of flowing water is sufficiently utilized. On the other hand, the overall height of the device is reasonable, and no obstruction to the incoming flow is posed.

The equipment is easy to install and can sufficiently utilize the kinetic energy of flowing water. It can be used alone or in clusters, avoiding the scouring of downstream seabed or riverbed and the tilting moment generated by flowing water when the runner is installed independently.

The above is only a preferred embodiment of the present invention and is not intended to limit it. For those skilled in the art, the present invention may have various modifications and variations. Any modifications, equivalent substitutions, improvements, etc. made within the spirit and principles of the present invention shall be included within the scope of protection of the present invention. It should be noted that similar labels and letters represent similar terms in the following figures. Therefore, once a term is defined in one figure, it does not need to be further defined or explained in subsequent figures.

The above are only specific embodiments of the present invention, but the scope of protection of the present invention is not limited to this. Any skilled person familiar with the technical field within the scope of the disclosed technology can easily think of changes or replacements, which should be covered within the scope of protection of the present invention.

It should be noted that in this article, relational terms such as first and second are only used to distinguish one entity or operation from another entity or operation, and do not necessarily require or imply any actual relationship or order between these entities or operations. Moreover, the terms "including" or any other variation thereof are intended to encompass non-exclusive inclusion, such that a process, method, item or device that includes a series of elements not only includes those elements, but also includes other elements that are not explicitly listed or also includes elements inherent to such process, method, item or device. Without further limitations, the elements limited by the statement "including one . . . " do not exclude the existence of other identical elements in the process, method, item or device that includes the said elements.

What is claimed is:

1. A hydropower equipment with graded utilization of kinetic energy of flowing water, comprising a triangular base and three runners, an inclined surface of the triangular base being a segmented smooth surface, three steps being formed from top to bottom on the inclined surface, a vertical surface of each of the steps being equipped with support rods, and runner one, runner two and runner three of the three runners arranged from high to low being rotatably supported on the corresponding support rods through shafts, and the three shafts all horizontally arranged and connected to corresponding shafts of generators separately; horizontal flow channels being set inside a lower part of the triangular base for guiding water to flow toward downstream direction, and outlets of the horizontal flow channels directly face a curved part of the blades of runner three.

2. The hydropower equipment with graded utilization of kinetic energy of flowing water according to claim 1, wherein each of the runner one, the runner two and the runner three comprises a hub and four blades, the four blades are uniformly distributed in circumference direction with an angle between adjacent blades is 90°, and a thickness of each of the blades gradually decreases from the hub to a blade tip, the blade is composed of a straight segment and an arc segment, and the flowing water impacts a concave surface of the arc segment of the blades, driving the blades to rotate from the concave surface to a convex surface of the blades, and the runners rotate and the blades alternate to a vertical position, the flowing water continues to impact the concave surface of the blades, and the runners remain rotating.

3. The hydropower equipment with graded utilization of kinetic energy of flowing water according to claim 2, wherein a single blade of each of the runners run to the vertical position while a blade tip points upward, and a height of the blades is higher than that of the vertical surface of the step on which the runners is located, and the water flowing from above impacts a protruding part of the blades.

4. The hydropower equipment with graded utilization of kinetic energy of flowing water according to claim 2, wherein when a single blade of the runner one is oriented in the vertical position, a length of a protruding part of the single blade relative to the step equals a radius of its arc segment.

5. The hydropower equipment with graded utilization of kinetic energy of flowing water according to claim 2, wherein when a single blade of the runner two is oriented in the vertical position, a length of a protruding part relative to the step equals a radius of its arc segment.

6. The hydropower equipment with graded utilization of kinetic energy of flowing water according to claim 2, wherein when a single blade of the runner three is oriented in the vertical position, a length of a protruding part relative to the step equals the radius of its arc segment.

7. The hydropower equipment with graded utilization of kinetic energy of flowing water according to claim 1, wherein the runner two and the runner one have the same dimensions, and a diameter of the runner three is 1.5 times the diameter of runner two and runner one.

8. The hydropower equipment with graded utilization of kinetic energy of flowing water according to claim 1, wherein the runner one, the runner two and the runner three are all connected to the corresponding shafts of the generators through struts, and the shafts are coaxially connected to the corresponding shafts of the generators.

9. The hydropower equipment with graded utilization of kinetic energy of flowing water according to claim 1, wherein a cross section of the triangular base takes a shape of a right angled triangle, and one right angled edge of the triangular base is horizontally placed for contact with a seabed or a riverbed, and the other right angled edge is vertically placed.

10. The hydropower equipment with graded utilization of kinetic energy of flowing water according to claim 1, wherein two horizontal flow channels with rectangular cross sections are set inside the lower part of the triangular base, and a height of two outlets corresponds to ¾ the diameter of the runners, and axial positions of the two outlets correspond to ¼ and ¾ of the first shafts of the runners, respectively; the runner three undergoes simultaneously the impact of the stream of water from the inclined plane and two streams of water discharged from the horizontal channels.

11. The hydropower equipment with graded utilization of kinetic energy of flowing water according to claim 1, wherein the triangular base is fabricated through cement pouring, and the vertical surface of the steps is pre-embedded with the support rods.

* * * * *